United States Patent
Tanaka et al.

(10) Patent No.: US 8,226,261 B2
(45) Date of Patent: Jul. 24, 2012

(54) ILLUMINATION DEVICE, BACKLIGHT DEVICE USED FOR LIQUID CRYSTAL DISPLAY APPARATUS AND LIQUID CRYSTAL DISPLAY APPARATUS

(75) Inventors: Atsuyuki Tanaka, Tenri (JP); Takeshi Masuda, Ikoma (JP); Yukihiro Sumida, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 530 days.

(21) Appl. No.: 12/441,751

(22) PCT Filed: Jun. 26, 2007

(86) PCT No.: PCT/JP2007/062757
§ 371 (c)(1),
(2), (4) Date: Mar. 18, 2009

(87) PCT Pub. No.: WO2008/035493
PCT Pub. Date: Mar. 27, 2008

(65) Prior Publication Data
US 2009/0268127 A1 Oct. 29, 2009

(30) Foreign Application Priority Data
Sep. 20, 2006 (JP) .................................. 2006-255021

(51) Int. Cl.
*F21V 23/00* (2006.01)
(52) U.S. Cl. ....... 362/227; 362/235; 362/97.2; 362/238; 362/613
(58) Field of Classification Search .................. 362/612, 362/613, 97.2, 97.3, 800, 235, 0.238
See application file for complete search history.

(56) References Cited

U.S. PATENT DOCUMENTS

| | | | | |
|---|---|---|---|---|
| 6,857,767 B2 * | 2/2005 | Matsui et al. | ................. | 362/373 |
| 7,309,145 B2 * | 12/2007 | Nagata et al. | ................. | 362/294 |
| 7,481,553 B2 * | 1/2009 | Kim et al. | ..................... | 362/240 |
| 7,554,625 B2 * | 6/2009 | Koganezawa | ................... | 349/61 |
| 7,658,529 B2 * | 2/2010 | Aoki et al. | ..................... | 362/559 |
| 7,677,750 B2 * | 3/2010 | Jeon et al. | ..................... | 362/97.3 |
| 2005/0259195 A1 | 11/2005 | Koganezawa | | |
| 2007/0013647 A1 | 1/2007 | Lee et al. | | |
| 2007/0070625 A1 | 3/2007 | Bang | | |
| 2007/0153515 A1 | 7/2007 | Hong et al. | | |
| 2008/0024696 A1 | 1/2008 | Arai et al. | | |
| 2008/0245949 A1 | 10/2008 | Morimoto et al. | | |

(Continued)

FOREIGN PATENT DOCUMENTS
JP 10-039300 A 2/1998
(Continued)

OTHER PUBLICATIONS

Official Communication issued in International Patent Application No. PCT/JP2007/062757, mailed on Oct. 2, 2007.

*Primary Examiner* — Anabel Ton
(74) *Attorney, Agent, or Firm* — Keating & Bennett, LLP

(57) ABSTRACT

An illumination device including a plurality of illumination areas, each of which is individually controllable, includes a plurality of light-emitting devices disposed in a matrix pattern in each of the illumination areas where emission colors are disposed in a different manner between adjacent rows and between adjacent columns. Consequently, the emission of uneven luminance or uneven color is prevented from occurring in boundary portions of each of the illumination areas.

10 Claims, 14 Drawing Sheets

U.S. PATENT DOCUMENTS

2009/0097230 A1 * 4/2009 Masuda et al. ............... 362/97.2

FOREIGN PATENT DOCUMENTS

| | | | |
|---|---|---|---|
| JP | 2002-099250 A | 4/2002 |
| JP | 2006-133721 A | 5/2006 |
| JP | 2006-302622 A | 11/2006 |
| JP | 2007-087662 A | 4/2007 |
| JP | 2007-180022 A | 7/2007 |
| WO | 2007/064001 A1 | 6/2007 |

* cited by examiner

ILLUMINATION DEVICE, BACKLIGHT DEVICE USED FOR LIQUID CRYSTAL DISPLAY APPARATUS AND LIQUID CRYSTAL DISPLAY APPARATUS

BACKGROUND OF THE INVENTION

1. Field of the Invention

The present invention relates to an illumination device used for a liquid crystal display apparatus and the like.

2. Description of the Related Art

As compared with a CRT, a display contrast (dynamic range) of a liquid crystal display apparatus is lower and an improvement therein is desired. For example, Japanese Patent Application Publication, Tokukai, No. 2002-99250 discloses a liquid crystal display apparatus wherein a plurality of illumination areas, each of which has a luminance that is individually controllable, is formed in a backlight device. The liquid crystal display apparatus thereby controls luminance of each of the illumination areas of the backlight device according to luminance and darkness of an image displayed in a liquid crystal panel. This liquid crystal display apparatus controls the luminance of the illumination areas so that the luminance is high in the illumination area corresponding to a display area where a bright image is displayed while the luminance is low in the illumination area corresponding to the display area where a dark image is displayed. A display dynamic range is thereby enlarged and the liquid crystal display apparatus thus realizes a display with a high sense of contrast.

Here, as illustrated in FIG. 22, Japanese Patent Application Publication, Tokukai, No. 2002-99250 discloses a backlight device 112 including: a plurality of illumination areas that include cold cathode fluorescent tubes 101 and white LEDs (not illustrated) as light sources; and a separation wall 102 partitioning each of the illumination areas.

However, there is a problem in the backlight device 112 of FIG. 22. The backlight device 112 can prevent leakage of light (cross talk) between the illumination areas by the separation wall 102. On the other hand, in the case where the luminance is individually controlled in each of the illumination areas, variations in wavelength of the white LED in each of the illumination areas cause the emission of uneven luminance or uneven color in the vicinity of the separation wall. Such a problem stands out when LEDs with high color reproducibility corresponding to R, G, and B, respectively are used as light sources. This causes the degradation in a display quality.

SUMMARY OF THE INVENTION

Preferred embodiments of the present invention provide an illumination device including a plurality of illumination areas that are individually controllable, in which illumination device the emission of the uneven luminance or uneven color is prevented from occurring in boundary portions of each of the illumination areas.

An illumination device according to a preferred embodiment of the present invention including a plurality of illumination areas, each of which is individually controllable, includes a plurality of light-emitting devices disposed in a matrix pattern in each of the illumination areas where emission colors are different between adjacent rows and between adjacent columns. The emission colors being different between the adjacent rows and between the adjacent columns facilitates a color mixture at the boundary portion of the illumination area even if each of the illumination areas is individually controlled. This makes it possible to effectively prevent the emission of the uneven luminance or uneven color at the boundary portion of the illumination area. In this case, it is possible to more effectively prevent the emission of the uneven color as long as an interval between each of the light-emitting devices is approximately a quarter or less of a height of a first separation wall.

It is preferable that the illumination device further includes: the first separation wall (outer circumferential wall) surrounding the illumination areas; and a second separation wall partitioning each of the illumination areas and being lower than the first separation wall. This makes it possible to prevent the emission of the uneven luminance or uneven color in the vicinity of the second separation wall and to reduce the cross talk between each of the illumination areas as well. In this case, it is preferable that the second separation wall be approximately half or less as high as the first separation wall. This makes it possible to prevent the vicinity of the second separation wall from being dark by a mixture of lights from each of the light-emitting devices on the second separation wall when each of the illumination areas is lit up in the same luminance. Therefore, the entire illumination areas can be uniformly illuminated.

In the illumination device, it is preferable that each of the light-emitting devices be an LED. In this case, the light-emitting devices may be arranged to include red, green, and blue LEDs.

In order to solve the aforementioned problems, an illumination device according to a preferred embodiment of the present invention including a plurality of illumination areas, each of which is individually controllable, includes light-emitting packages in each of which a plurality of light-emitting devices are packaged, the light-emitting packages being disposed in a matrix pattern in each of the illumination areas, emission colors being different between adjacent light-emitting device packages. The emission colors being different between the adjacent light-emitting device packages facilitates the color mixture at the boundary portion of the illumination area even if each of the illumination areas is individually controlled. This makes it possible to effectively prevent the emission of the uneven luminance or uneven color at the boundary portion of the illumination area. In this case, it is possible to more effectively prevent the emission of the uneven color as long as an interval between each of the light-emitting device packages is equivalent to or less than a height of the first separation wall.

It is preferable that the illumination device also includes: a first separation wall surrounding the illumination areas; and a second separation wall partitioning each of the illumination areas and being lower than the first separation wall. This makes it possible to prevent the emission of the uneven luminance or uneven color in the vicinity of the second separation wall and to reduce the cross talk between each of the illumination areas as well. In this case, it is preferable that the second separation wall be approximately half or less as high as the first separation wall. This makes it possible to prevent the vicinity of the second separation wall from being dark by the mixture of lights from each of the light-emitting devices on the second separation wall when each of the illumination areas is lit up in the same luminance. Therefore, the entire illumination areas can be uniformly illuminated.

In the illumination device, it is preferable that each of the light-emitting devices be an LED. In this case, the light-emitting devices may be arranged to include red, green, and blue LEDs. Furthermore, one red LED, one green LED, and one blue LED may be disposed in a delta pattern in each of the light-emitting device packages. Moreover, one red LED, two green LEDs, and one blue LED are disposed in a matrix pattern in each of the light-emitting device packages.

In order to solve the aforementioned problems, an illumination device according to a preferred embodiment of the present invention including a plurality of illumination areas, each of which is individually controllable and provided with a plurality of light-emitting devices of a same color (e.g., a white LED), includes: a first separation wall surrounding the illumination areas; and a second separation wall partitioning each of the illumination areas and being lower than the first separation wall. In the aforementioned configuration, it is preferable that the second separation wall be approximately half or less as high as the first separation wall. This makes it possible to prevent the vicinity of the second separation wall from being dark by the mixture of lights from each of the light-emitting devices on the second separation wall when each of the illumination areas is lit up in the same luminance. Therefore, the entire illumination areas can be uniformly illuminated.

An illumination device according to a preferred embodiment of the present invention including a plurality of illumination areas, each of which is individually controllable, includes: a first separation wall surrounding the illumination areas; and a second separation wall partitioning each of the illumination areas and being lower than the first separation wall; each of the illumination areas including a plurality of light-emitting device packages in each of which a plurality of light-emitting devices emitting different colors are two-dimensionally disposed, emission colors in one of two adjacent light-emitting device packages being different from emission colors in the other of the two adjacent light-emitting device packages.

An illumination device according to a preferred embodiment of the present invention including a plurality of illumination areas, each of which is individually controllable, includes: a first separation wall surrounding the illumination areas; and a second separation wall partitioning each of the illumination areas and being lower than the first separation wall, each of the illumination areas including a plurality of light-emitting devices that are two-dimensionally disposed, an emission color of one of two adjacent light-emitting devices being different from the other of the two adjacent light-emitting devices.

It is also possible to configure the illumination device according to a preferred embodiment of the present invention to further include a light diffusion plate provided so as to face each of the light-emitting devices, a distance between the light diffusion plate and each of the light-emitting devices being equivalent to the height of the first separation wall.

A backlight device for a liquid crystal display apparatus according to another preferred embodiment of the present invention includes the aforementioned illumination device.

A liquid crystal display apparatus according to a preferred embodiment of the present invention includes the aforementioned illumination device.

As mentioned above, according to the illumination device, it is possible to prevent the emission of a colored contour (the uneven color) in the vicinity of the boundary portions of each of the illumination areas (second separation wall) in the illumination device including the plurality of illumination areas, each of which is individually controllable (e.g., an active backlight device).

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Preferred embodiments of the present invention are described below with reference to FIGS. 1 to 20B.

Figure 1:
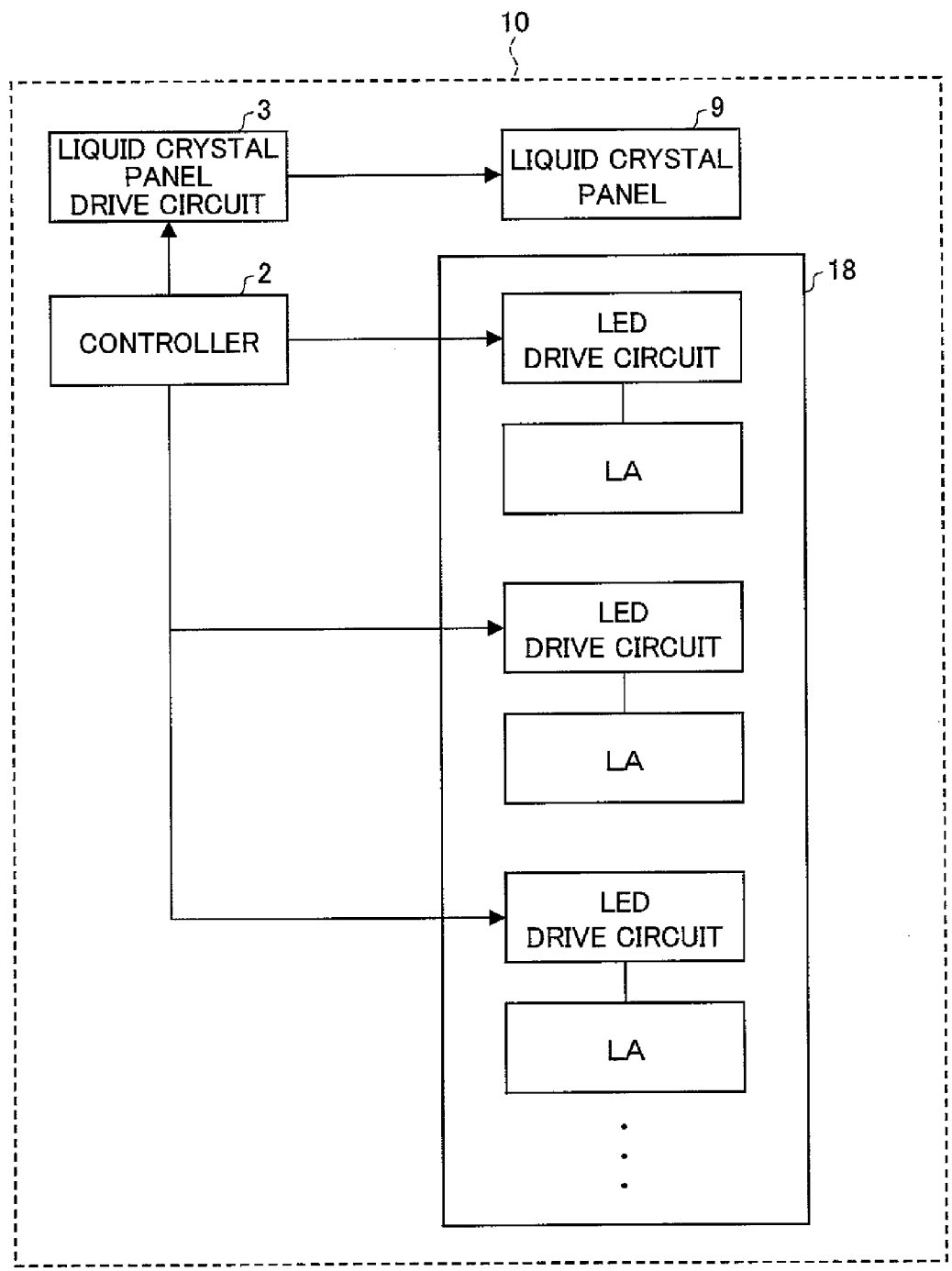
FIG. 1 is a block diagram showing a configuration of a liquid crystal display apparatus according to a preferred embodiment of the present invention.

As illustrated in FIG. 1, a liquid crystal display apparatus 10 according to a preferred embodiment of the present invention includes a liquid crystal panel 9, a liquid crystal panel drive circuit 3, a controller 2, a backlight device (illumination device) 18, and an optical member, such as a diffusion plate or the like (not illustrated). The controller 2 controls the liquid crystal panel drive circuit 3 and the backlight device 18 on the basis of image data inputted thereinto. The liquid crystal panel drive circuit 3 drives the liquid crystal panel 9 in response to control of the controller 2. The backlight device 18 irradiates light in response to control of the controller 2. The light irradiated by the backlight device 18 is supplied to the liquid crystal panel 9 via the diffusion plate (not illustrated).

Figure 2:
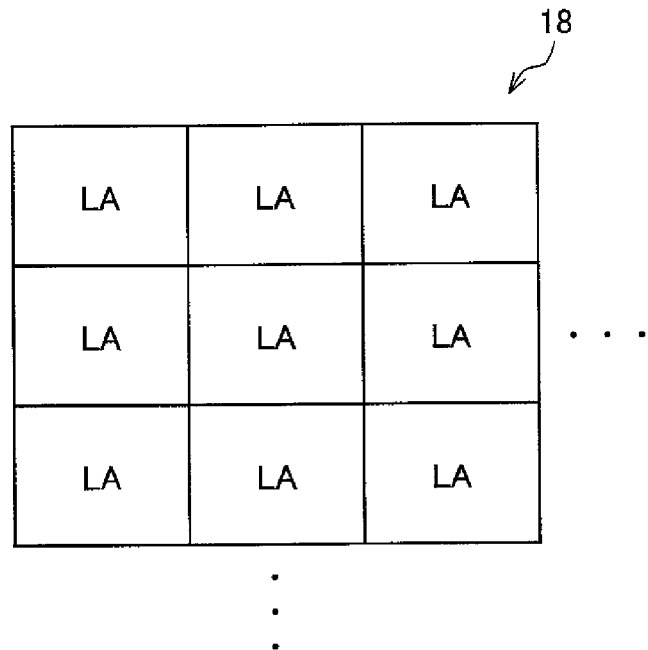
FIG. 2 is a plan view showing a configuration of a backlight device according to a preferred embodiment of the present invention.

The backlight device 18 preferably includes: a plurality of illumination areas (LA) disposed in a matrix pattern as illustrated in FIG. 2 for example; and LED drive circuits corresponding to the respective illumination areas. Each of the illumination areas LA is provided with a plurality of LEDs. These LEDs are driven by the LED drive circuit controlled by the controller 2.

Preferred Embodiment 1

Figure 3:
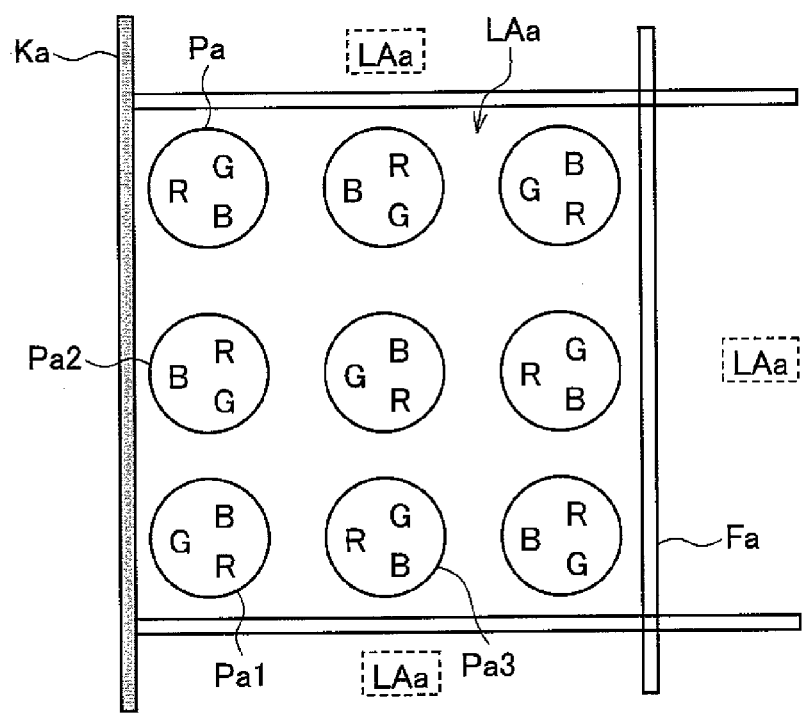
FIG. 3 is a plan view showing a configuration of a backlight device of a first preferred embodiment of the present invention.
Figure 4:
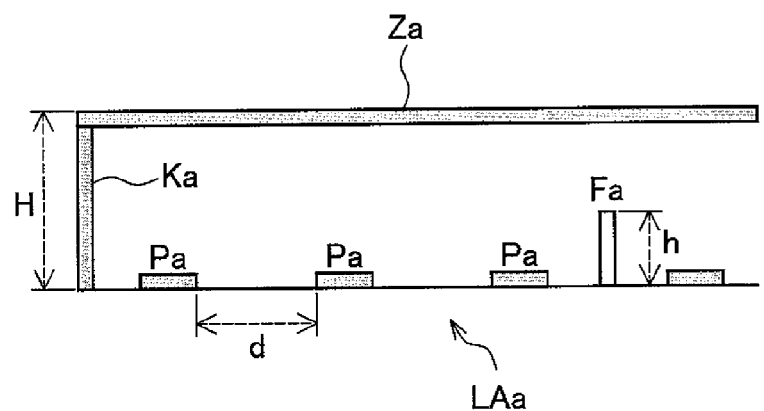
FIG. 4 is a cross-sectional view showing the configuration of a backlight device of a first preferred embodiment of the present invention.

The backlight device of the present preferred embodiment, as illustrated in FIGS. 3 and 4, includes a plurality of illumination areas LAa, each of which is provided with nine LED packages Pa. The LED package Pa is a white light-emitting LED package wherein a red LED (abbreviated as R), a green LED (abbreviated as G), and a blue LED (abbreviated as B) are disposed in a delta pattern. The LED packages Pa are disposed in a matrix pattern in the illumination area LAa. Furthermore, the illumination areas LAa are partitioned by a second separation wall Fa and a first separation wall (outer circumferential wall) Ka is arranged so as to surround the whole illumination areas. Moreover, a light diffusion plate Za is provided at an upper portion of the LED package Pa. Here, a distance between the LED package Pa and the light diffusion plate Za is substantially equivalent to a height H of the first separation wall Ka.

In the present preferred embodiment, a size of each of the illumination areas LAa, the height H of the first separation wall Ka, and a height h of the second separation wall Fa are preferably set to approximately 60 mm×60 mm, 20 mm, and 10 mm, respectively, for example. Furthermore, in one illumination area, nine LED packages Pa are preferably disposed at intervals of about 20 mm, for example. For the light diffusion plate Za, CLAREX DR-IIIC DR-60C (2.0 mm in thickness, with 96% HaZe rate) manufactured by Nitto Resin Industries Co., Ltd. is preferably used, for example.

Here, in each of the illumination areas LAa, LEDs (R, G, B) are disposed in a different manner between adjacent LED packages Pa. That is, positions of the LEDs (R, G, B) are changed between the adjacent LED packages Pa so as to prevent the LEDs of the same color from being disposed at the same position therebetween. For example, with reference to an LED package Pa1 and an LED package Pa2 which are adjacent to each other in a longitudinal direction, the LED package Pa1 is provided with the LEDs disposed clockwise from a position at twelve o'clock in the order of B, R, and G. On the other hand, the LED package Pa2 is provided with the LEDs disposed clockwise from the position at twelve o'clock in the order of R, G, and B. Moreover, with reference to the LED package Pa1 and an LED package Pa3 which are adjacent to each other in a lateral direction, the LED package Pa1 is provided with the LEDs disposed clockwise from the position at twelve o'clock in the order of B, R, and G. On the other hand, the LED package Pa3 is provided with the LEDs disposed clockwise from the position at twelve o'clock in the order of G, B, and R.

That is, focusing on a certain LED package Pa, (i) an LED package adjacent thereto in an upward direction is designed such that the emission colors are shifted (revolved) clockwise to the next positions; (ii) an LED package adjacent thereto in a downward direction is designed such that the emission colors are shifted (revolved) counterclockwise to the next positions; (iii) an LED package adjacent thereto in a leftward direction is designed such that the emission colors are shifted (revolved) clockwise to the next positions; and (iv) an LED package adjacent thereto in a rightward direction is designed such that the emission colors are shifted (revolved) counterclockwise to the next positions.

Figure 21:
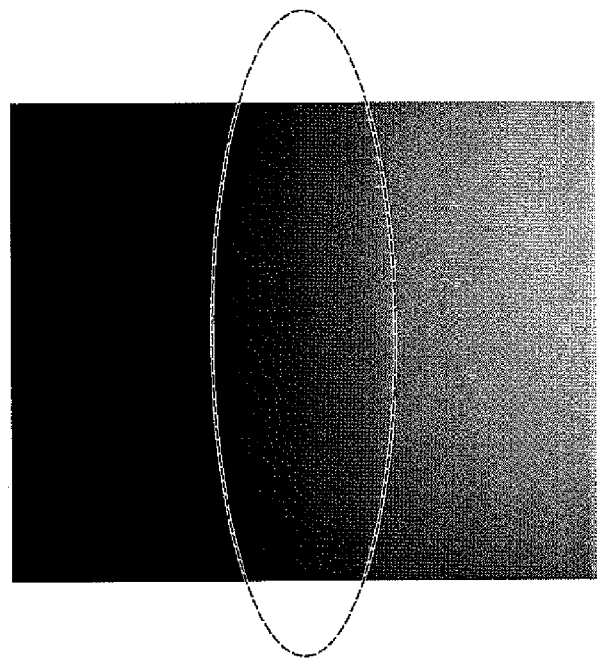
FIG. 21 illustrates unevenness (a contour) appearing in a conventional backlight device.
Figure 22:
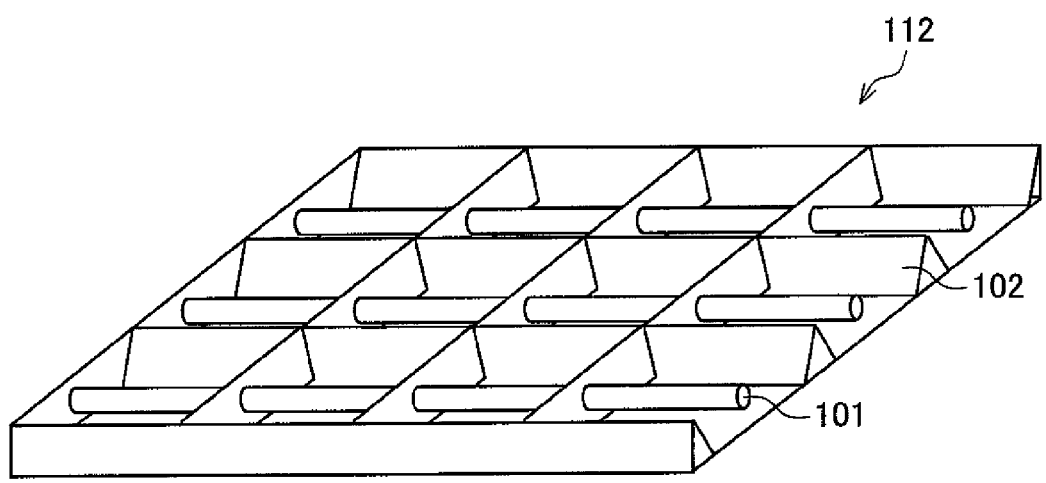
FIG. 22 is a perspective view showing a configuration of a conventional backlight device.

This facilitates the color mixture in the vicinity of the second separation wall Fa even if each of the illumination areas is individually controlled. This makes it possible to effectively prevent the emission of the uneven luminance or uneven color in the vicinity of the second separation wall Fa. In case where each of the illumination areas is individually controlled with the LEDs (R, G, B) disposed at the same positions in each of the LED packages, color separation occurs at the second separation wall Fa and the colored contour is observed on the light diffusion plate, as illustrated in FIG. 21.

Figure 5:
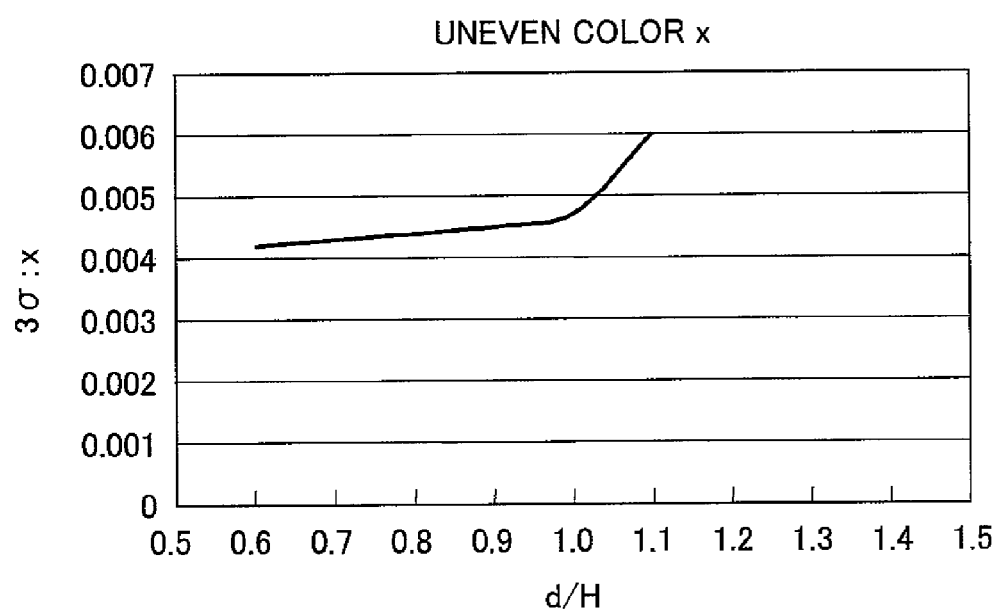
FIG. 5 is a graph showing uneven color x when an interval between LED packages is changed in the backlight device of FIG. 3.
Figure 6:
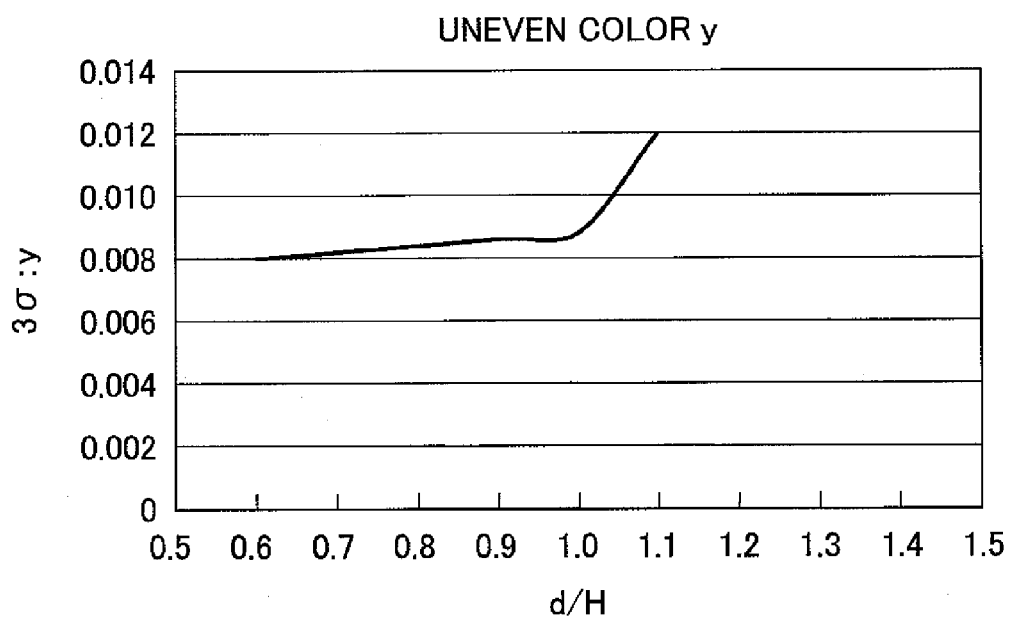
FIG. 6 is a graph showing uneven color y when the interval between LED packages is changed in the backlight device of FIG. 3.

Here, FIGS. 5 and 6 show a state where the emission of the uneven color occurs when an interval between the LED packages Pa is changed. An allowable value of the uneven color varies depending on how a liquid crystal display apparatus is used. In a liquid crystal television receiver and the like, x and y 3σ values of in-plane color unevenness are required to be about 0.005 or less and about 0.010 or less, respectively, for example. For this reason, it is preferable that the white LEDs be disposed at intervals of H (about 20 mm) or less, for example.

Furthermore, in the present preferred embodiment, the second separation wall Fa and the first separation wall Ka preferably are about 10 mm and about 20 mm in height, respectively, for example. The second separation wall Fa is thus approximately half or less as high as the first separation wall Ka. This makes it possible to prevent the vicinity of the second separation wall Fa from being darkened by the mixture of lights from each of the LED packages Pa on the second separation wall Fa when each of the illumination areas is lit up in the same luminance. Therefore, the entire illumination areas can be uniformly illuminated.

Figure 7:
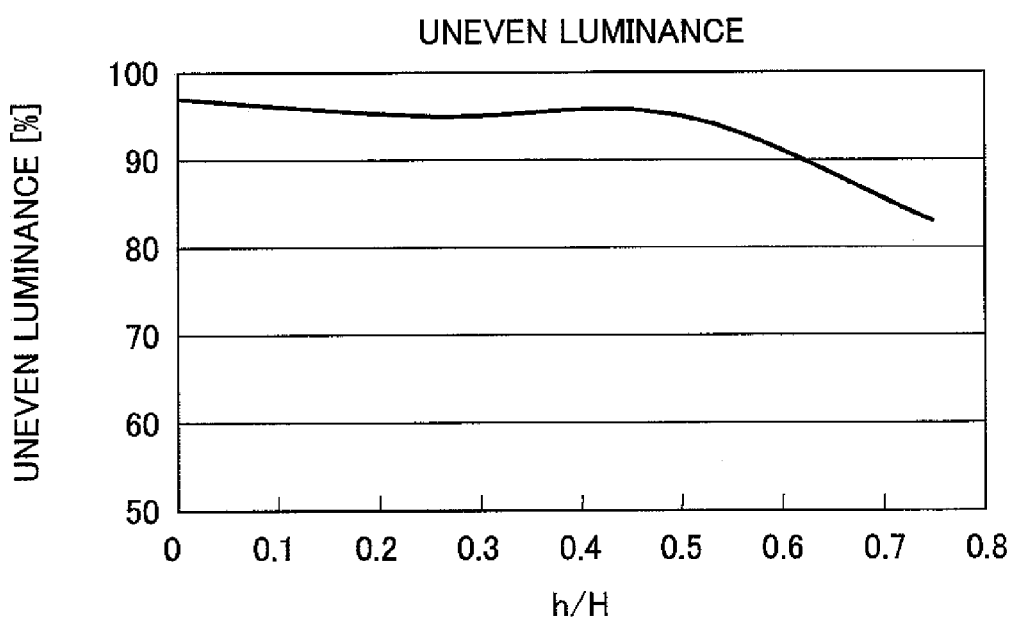
FIG. 7 is a graph showing uneven luminance when a height h of the second separation wall is changed in the backlight device of FIG. 3.

FIG. 7 shows a state where the emission of the uneven luminance occurs when a ratio (h/H) of the height H of the first separation wall Ka to the height h of the second separation wall Fa is changed. According to FIG. 6, in case where the separation wall ratio (h/H) is about 0.5 or less, the luminance distribution is in a favorable state at about 95% or more. On the other hand, in case where the ratio is about 0.5 or more, the luminance distribution drops. Generally, in a backlight device used for a liquid crystal television receiver, the luminance distribution is required to be about 95% or more, and it is thus preferable that the separation wall ratio (h/H) be set to about 0.5 or less, for example.

Figure 8:
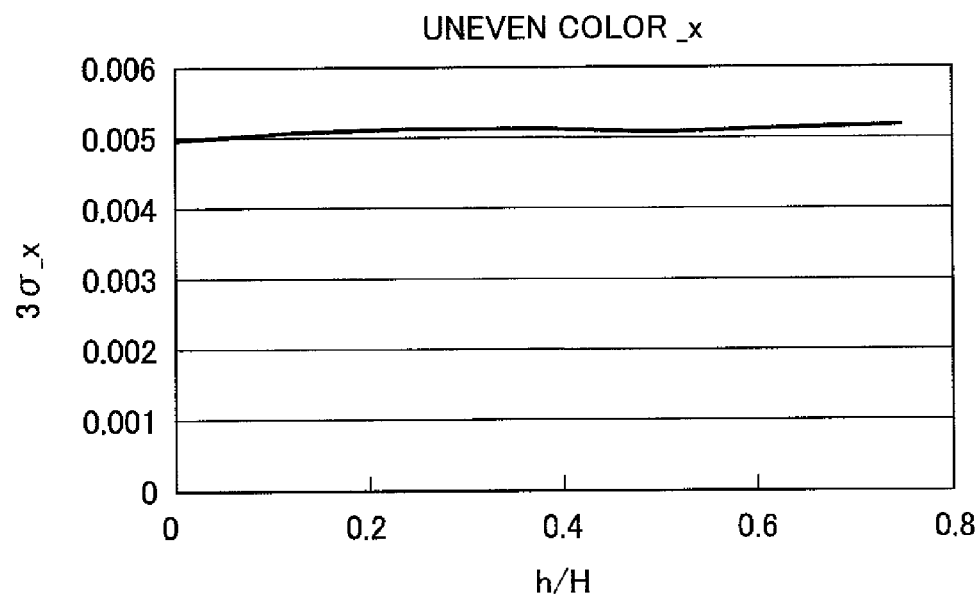
FIG. 8 is a graph showing the uneven color x when the height h of the second separation wall is changed in the backlight device of FIG. 3.
Figure 9:
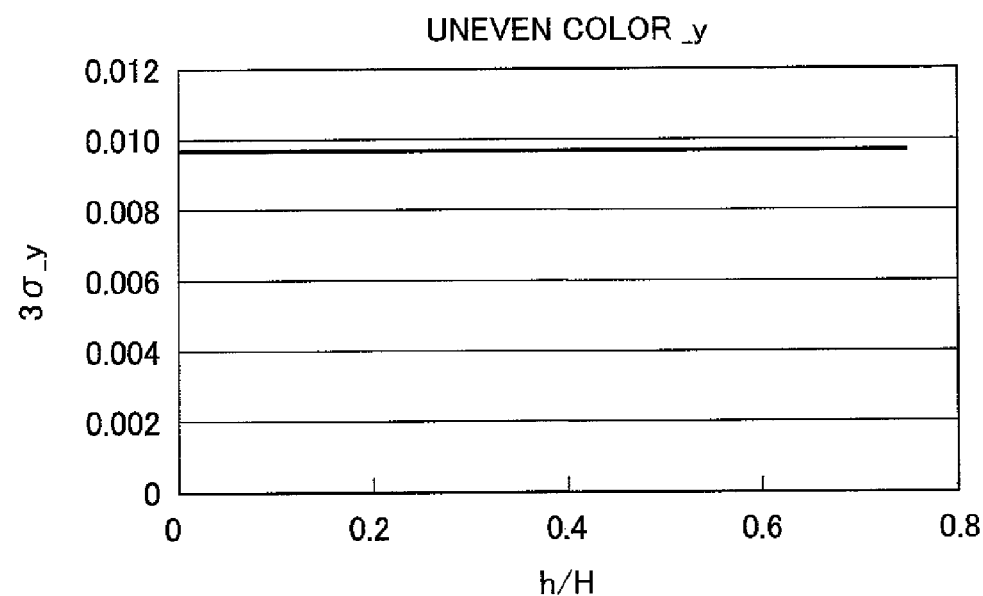
FIG. 9 is a graph showing the uneven color y when the height h of the second separation wall is changed in the backlight device of FIG. 3.

Moreover, FIGS. 8 and 9 show a state where the emission of the uneven color (x and y) occurs when the ratio (h/H) of the height H of the first separation wall Ka to the height h of the second separation wall Fa is changed. The emission of the uneven color is invariable almost independent of the separation wall ratio (h/H). Therefore, the separation wall ratio (h/H) may be set to about 0.5 or less, for example, in consideration of the uneven luminance and uneven color.

Figure 10A:
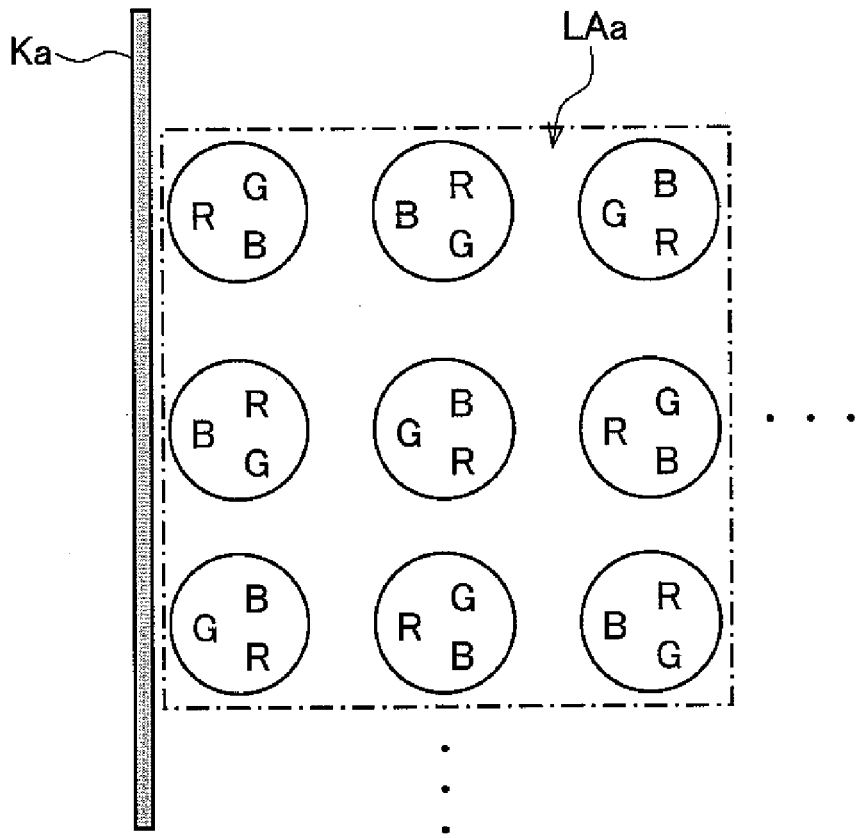
FIG. 10A is a plan view showing a configuration of another backlight device of the first preferred embodiment of the present invention.
Figure 10B:
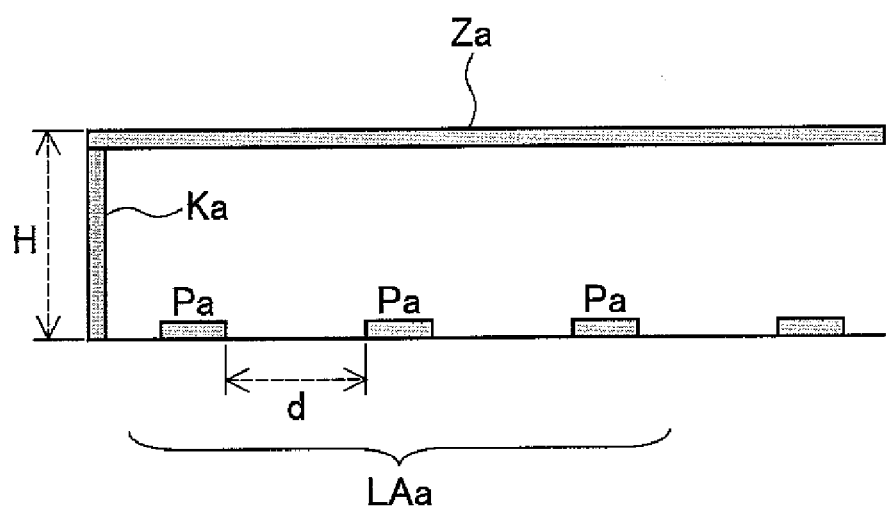
FIG. 10B is a cross-sectional view showing the configuration of the backlight device shown in FIG. 10A.

Furthermore, the backlight device of the present preferred embodiment can also be configured to have no separation wall partitioning the illumination areas, as illustrated in FIGS. 10A and 10B. This configuration also facilitates the color mixture in the vicinity of the boundary portions of each of the illumination areas. Therefore, it is possible to prevent the emission of the uneven luminance or uneven color.

As described above, the backlight device of the first preferred embodiment includes the plurality of illumination areas LA partitioned by the second separation wall Fa and each of the illumination areas LA is individually controllable. In case where all the illumination areas LA are lit up in the same luminance, the entire illumination areas can be uniformly illuminated. On the other hand, in case where each of the illumination areas LA is individually controlled, the luminance can be changed smoothly with no contour appearing in the vicinity of the second separation wall Fa. Therefore, the liquid crystal display apparatus 1 including the backlight device according to a preferred embodiment of the present invention makes it possible to effectively improve a display quality by individually controlling the illumination areas LA.

In the present preferred embodiment, 3 LEDs (R, G, B) are preferably disposed in each of the LED packages, but the disposition is not limited to this. The number of LEDs or the disposition of the LEDs are not limited as long as each of the LEDs (R, G, B) are disposed in a different manner between the adjacent LED packages. For example, the number and the disposition of LEDs may be those of an illumination area LAx in FIG. 11A in which a plurality of LED packages Px are disposed in a matrix pattern and each of the LED packages Px includes four LEDs, that is, one red LED (R), two green LEDs (G·G) and one blue LED (B) that are disposed in a matrix pattern.

Figure 11A:
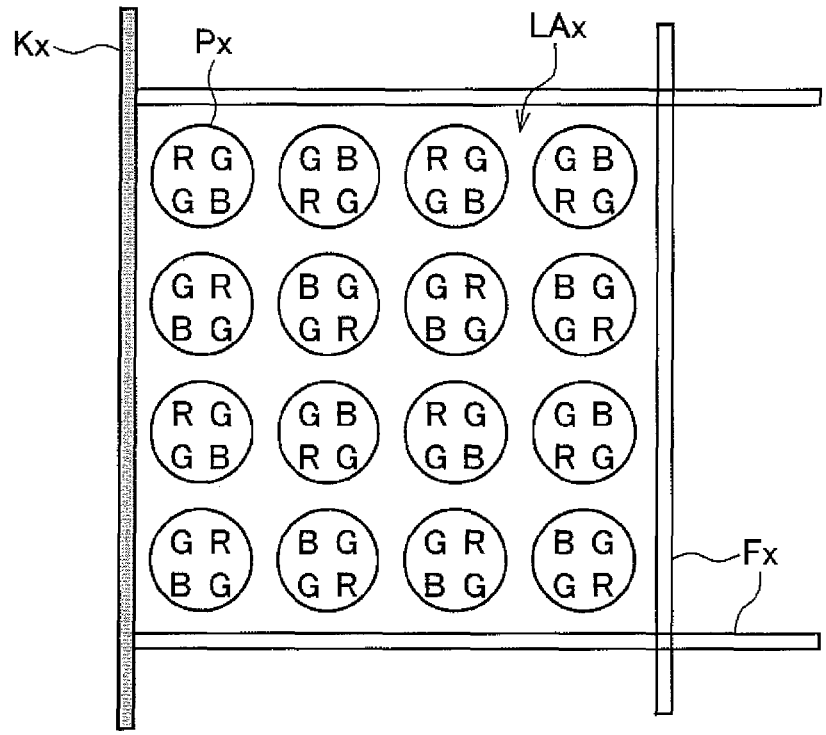
FIG. 11A is a plan view showing a configuration of another backlight device of the first preferred embodiment of the present invention.
Figure 11B:
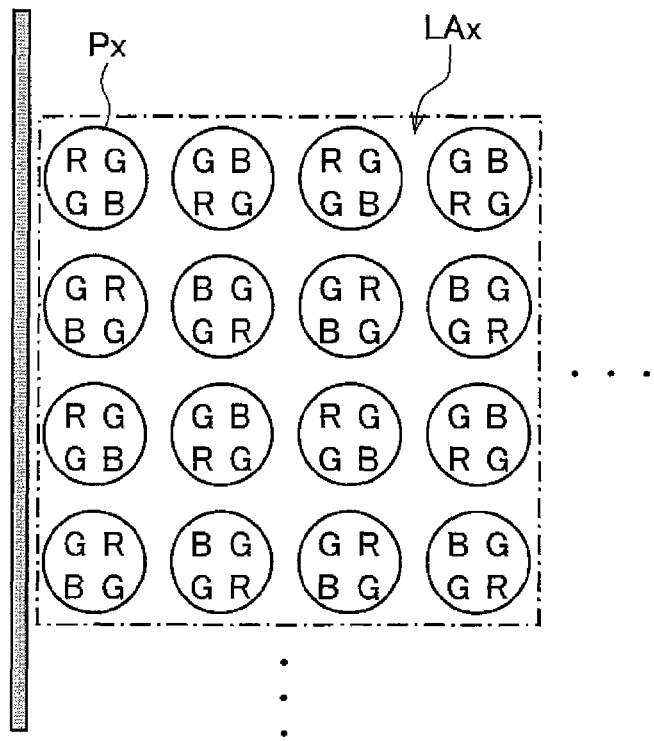
FIG. 11B is a plan view showing a configuration of another backlight device of the first preferred embodiment of the present invention.

Here, in case where a certain LED package is designed such that R and G are disposed from the left in a first row and G and B are disposed from the left in a second row, an LED package adjacent to the right side thereof is designed such that G and B are disposed from the left in a first row and R and G are disposed from the left in a second row. Further, an LED package adjacent to the lower side thereof is designed such that G and R are disposed from the left in a first row and B and G are disposed from the left in a second row. In FIG. 11A, a first separation wall Fx partitioning the illumination areas LAx is provided so as to reduce the cross talk between the LED packages. However, as illustrated in FIG. 11B, the present invention may be arranged such that no separation wall partitioning the illumination areas LAx is provided. Note that it is preferable that an interval between the adjacent LED packages be set approximately equal to H (mm) or less, for example.

Preferred Embodiment 2

Figure 12:
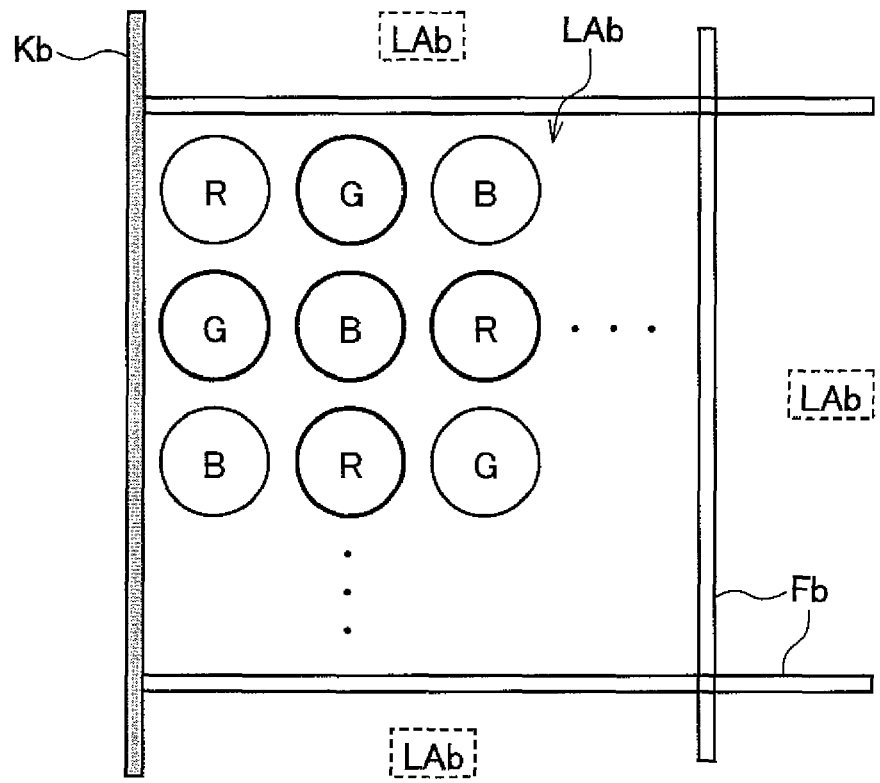
FIG. 12 is a plan view showing a configuration of a backlight device of a second preferred embodiment of the present invention.
Figure 13:
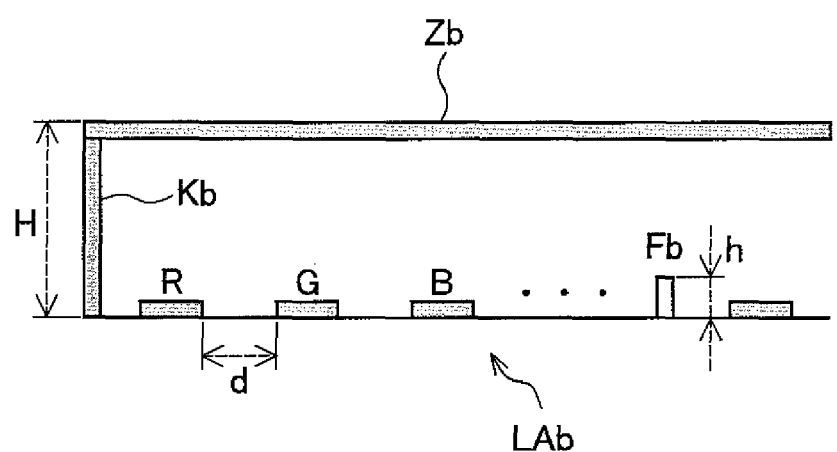
FIG. 13 is a cross-sectional view showing the configuration of a backlight device of the second preferred embodiment of the present invention.

The backlight device of the present preferred embodiment, as illustrated in FIGS. 12 and 13, includes a plurality of illumination areas LAb, each of which is preferably provided with, for example, 81 independent LEDs in total: 27 red LEDs (abbreviated as R); 27 green LEDs (abbreviated as G); and 27 blue LEDs (abbreviated as B). These LEDs are disposed in a matrix pattern in each of the illumination areas. Furthermore, each of the illumination areas LAb is partitioned by a second separation wall Fb and a first separation wall Kb is provided so as to surround the whole illumination areas. Moreover, a light diffusion plate Zb is set at an upper portion of each of the LEDs. Here, a distance between each of the LEDs and the light diffusion plate Zb is substantially equivalent to a height H of the first separation wall Kb, for example.

In the present preferred embodiment, a size of each of the illumination areas LAb, the height H of the first separation wall Kb, and a height h of the second separation wall Fb are preferably set to approximately 60 mm×60 mm, 20 mm, and 5 mm, respectively, for example. Furthermore, in one illumination area, the 81 LEDs are preferably disposed at intervals of about 5 mm, for example.

Here in each of the illumination areas LAb, where the 81 LEDs are disposed in a matrix pattern (9 pieces×9 pieces), the LEDs are disposed in a different manner between adjacent rows and between adjacent columns. That is, positions of each of the LEDs (R, G, B) are changed between the adjacent rows and between the adjacent columns so as to prevent the LEDs of the same color from being disposed at the same position therebetween.

For example, in case where the LEDs are disposed in the order of G, B, R, G, B, R, G, B, and R from the left in a certain row, the LEDs are disposed: in a row adjacent to the upper side of the certain row, in the order of R, G, B, R, G, B, R, G, and B; and in a row adjacent to the lower side of the certain row, in the order of B, R, G, B, R, G, B, R, and G.

Moreover, in case where the LEDs are disposed in the order of G, B, R, G, B, R, G, B, and R from the top in a certain column, the LEDs are disposed: in a column adjacent to the left side of the certain column, in the order of R, G, B, R, G, B, R, G, and B; and in a column adjacent to the right side of the certain column, in the order of B, R, G, B, R, G, B, R, and G.

This facilitates the color mixture in the vicinity of the second separation wall Fb even if each of the illumination areas is individually controlled. As a result, this makes it possible to effectively prevent the emission of the uneven luminance or uneven color in the vicinity of the second separation wall Fb.

Figure 14:
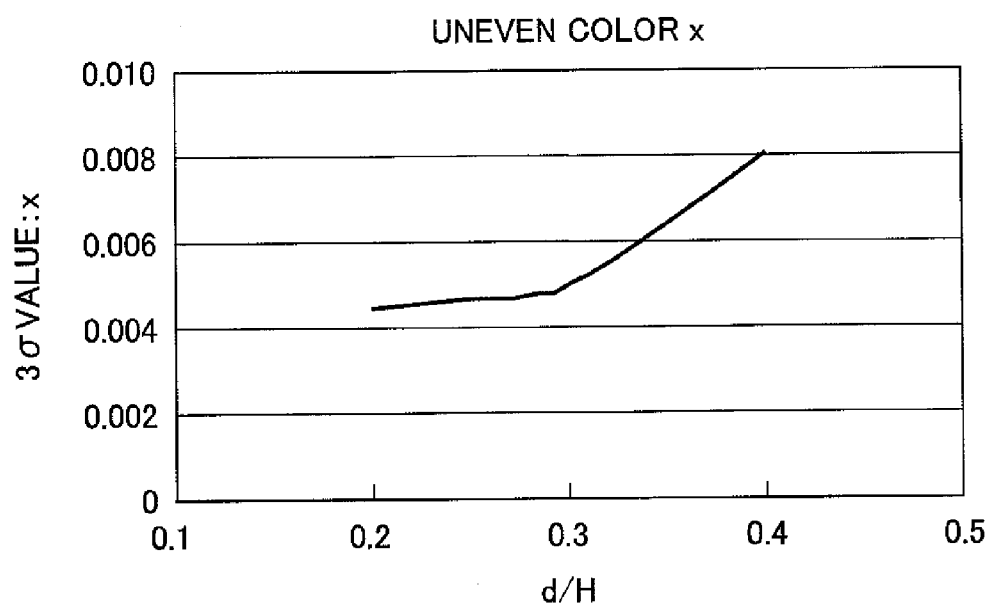
FIG. 14 is a graph showing uneven color x when an interval between LEDs is changed in the backlight device of FIG. 12.
Figure 15:
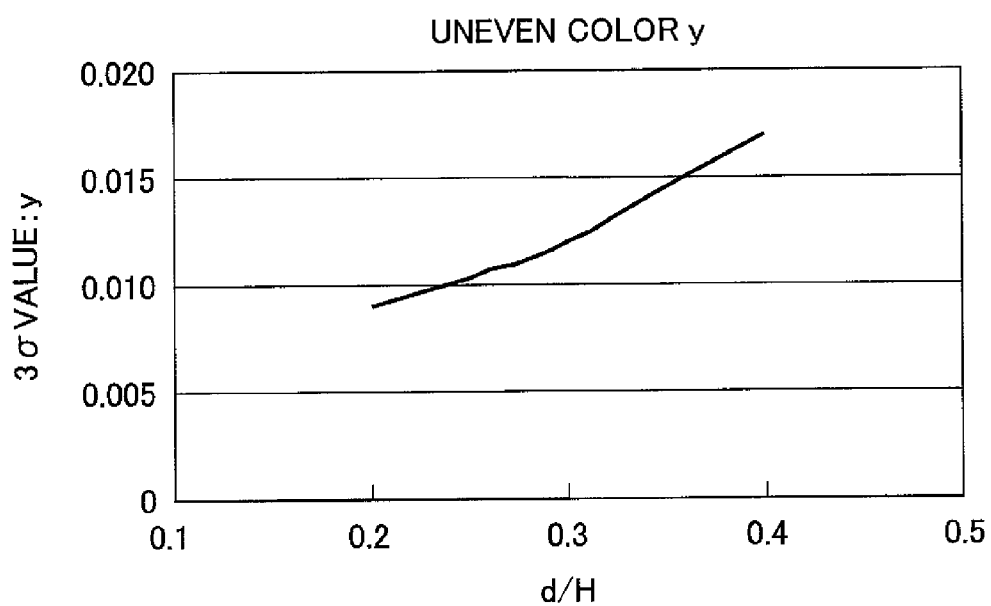
FIG. 15 is a graph showing uneven color y when the interval between LEDs is changed in the backlight device of FIG. 12.

Here FIGS. 14 and 15 show a state where the emission of the uneven color occurs when an interval d between each of the LEDs is changed. An allowable value of the uneven color varies depending on how a liquid crystal display apparatus is used. In a liquid crystal television receiver and the like, x and y 3σ values of in-plane color unevenness are required to be about 0.005 or less and about 0.010 or less, respectively, for example. For this reason, it is preferable that the white LEDs be disposed at intervals d of about 0.25×H (5 mm) or less, for example.

Furthermore, in the present preferred embodiment, the second separation wall Fb and the first separation wall Kb preferably are about 5 mm and about 20 mm in height, respectively, for example. The second separation wall Fa is thus approximately half or less as high as the first separation wall Ka. This makes it possible to prevent the vicinity of the second separation wall Fb from being darkened by the mixture of colors from each of the LEDs on the second separation wall Fb when each of the illumination areas is lit up in the same luminance. Therefore, the entire illumination areas can be uniformly illuminated.

Figure 16:
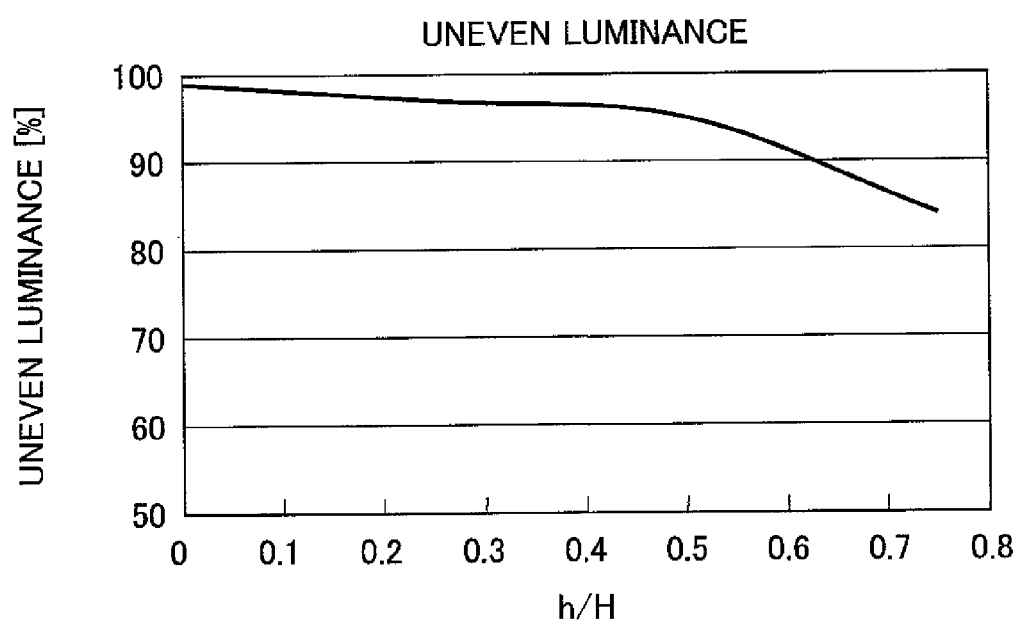
FIG. 16 is a graph showing uneven luminance when a height h of the second separation wall is changed in the backlight device of FIG. 13.

FIG. 16 shows a state where the emission of the uneven luminance occurs when a ratio (h/H) of the height H of the first separation wall Kb to the height h of the second separation wall Fb is changed. According to FIG. 16, in case where the separation wall ratio (h/H) is about 0.5 or less, the luminance distribution is in a favorable state at about 95% or more. On the other hand, in case where the ratio is about 0.5 or more, the luminance distribution drops. Generally, in a backlight device used for a liquid crystal television receiver, the luminance distribution is required to be about 95% or more, and it is thus preferable that the separation wall ratio (h/H) be set to about 0.5 or less, for example.

Figure 17:
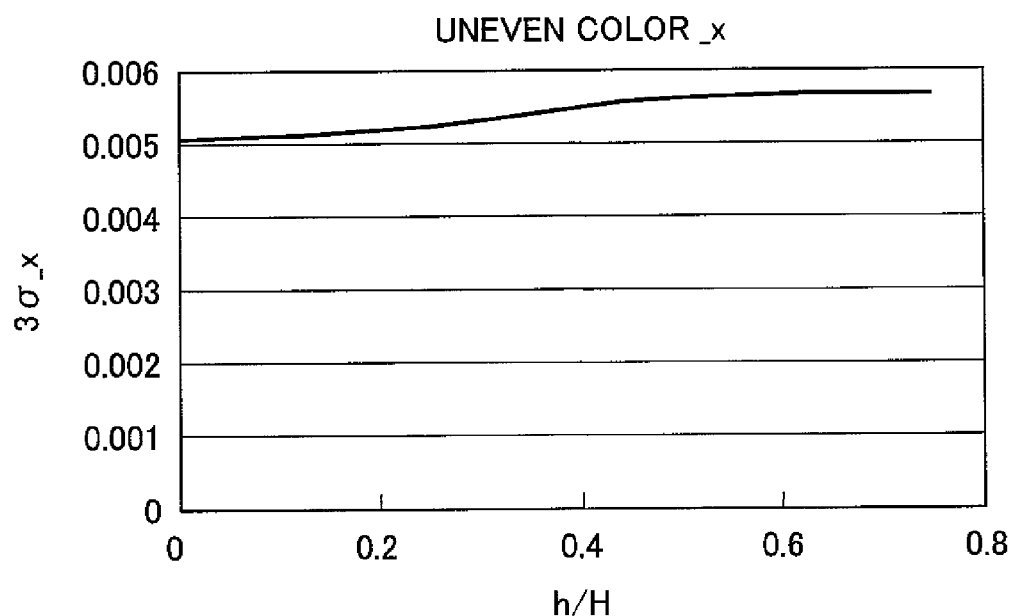
FIG. 17 is a graph showing uneven color x when the height h of the second separation wall is changed in the backlight device of FIG. 13.
Figure 18:
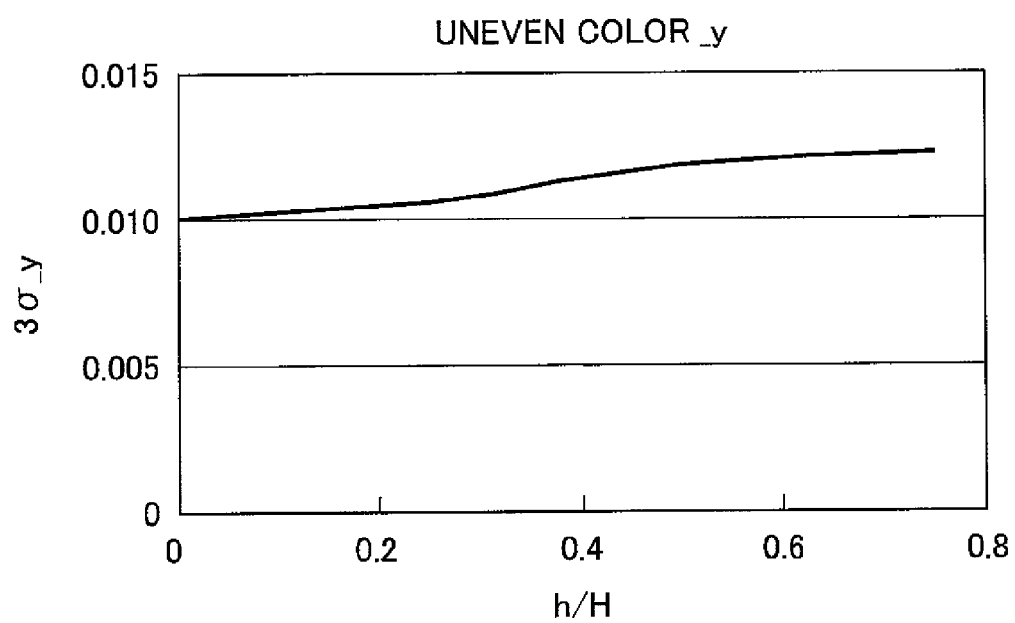
FIG. 18 is a graph showing uneven color y when the height h of the second separation wall is changed in the backlight device of FIG. 13.

Moreover, FIGS. 17 and 18 show a state where the emission of the uneven color occurs when the ratio (h/H) of the height H of the first separation wall Kb to the height of the second separation wall Fb is changed. According to these drawings, with the ratio (h/H) preferably set to about 0.25 or less, for example, the emission of the uneven color can be uniform. Therefore, the second separation wall Fb may be a quarter or less as high as the first separation wall Kb in consideration of the uneven luminance or uneven color.

Figure 19A:
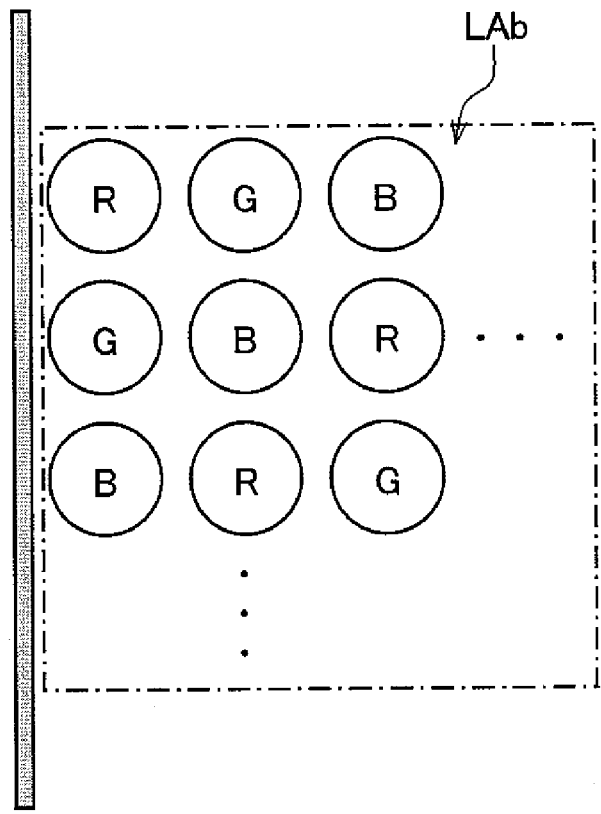
FIG. 19A is a plan view showing a configuration of another backlight device of the second preferred embodiment of the present invention.
Figure 19B:
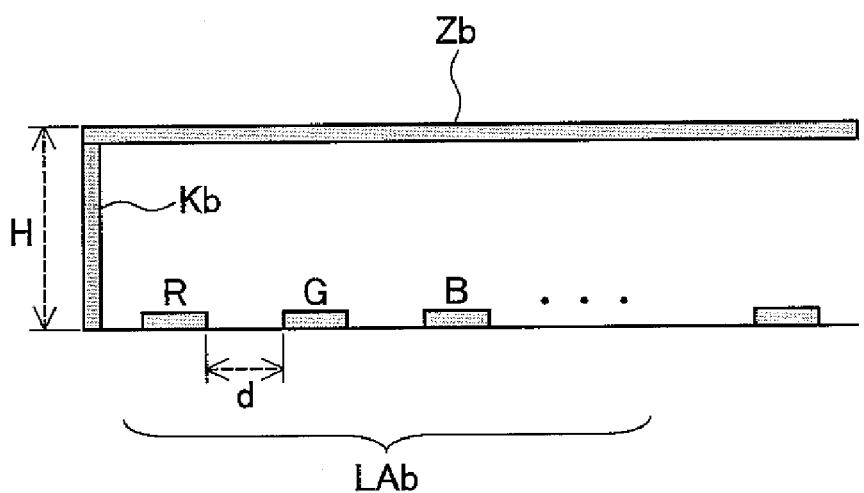
FIG. 19B is a cross-sectional view showing the configuration of the backlight device shown in FIG. 19A.

Furthermore, the backlight device according to a preferred embodiment of the present embodiment can also be configured to have no separation wall partitioning the illumination areas, as illustrated in FIGS. 19A and 19B. This configuration also facilitates the color mixture in the vicinity of the boundary portions of the illumination areas. Therefore, it is possible to prevent the emission of the uneven luminance or uneven color.

As described above, the backlight device of the first preferred embodiment includes the plurality of illumination areas LAb partitioned by the second separation wall Fb and each of the illumination areas LAb is individually controllable. In a case where all the illumination areas LAb are lit up in the same luminance, the entire illumination areas can be uniformly illuminated. On the other hand, in a case where each of the illumination areas LAb is individually controlled, the luminance can be changed smoothly with no contour appearing in the vicinity of the second separation wall Fb. Therefore, the liquid crystal display apparatus 1 including the backlight device makes it possible to effectively upgrade the display quality by individually controlling each of the illumination areas LAb.

Preferred Embodiment 3

Figure 20A:
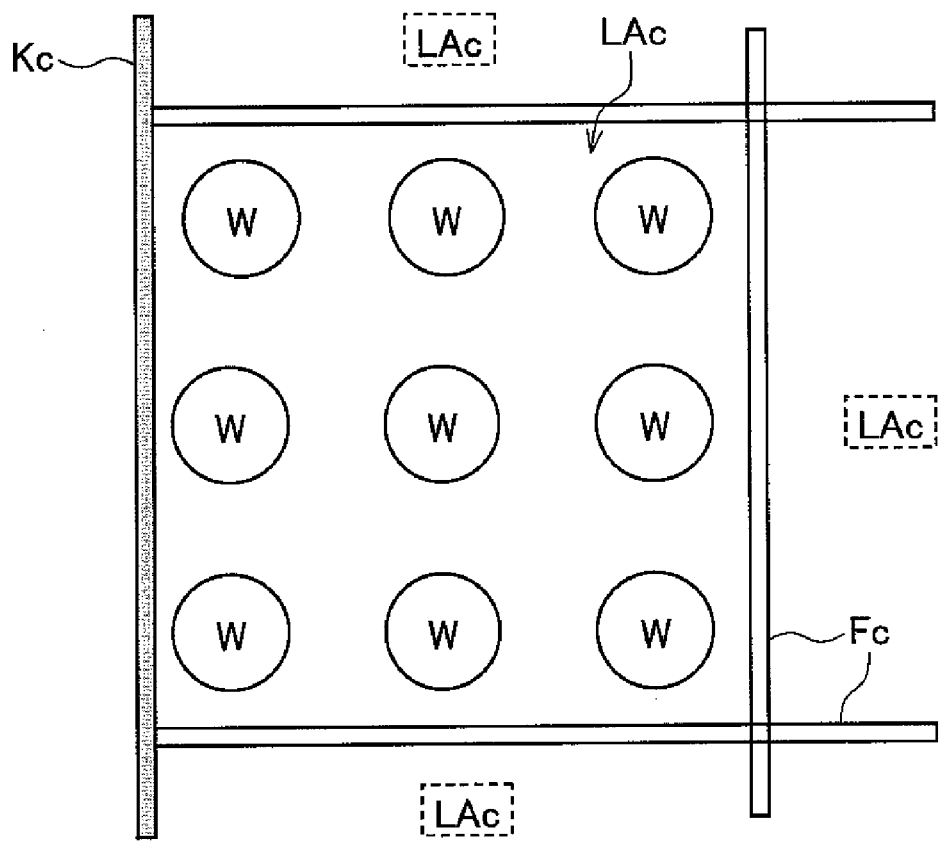
FIG. 20A is a plan view showing a configuration of a backlight device of a third preferred embodiment of the present invention.
Figure 20B:
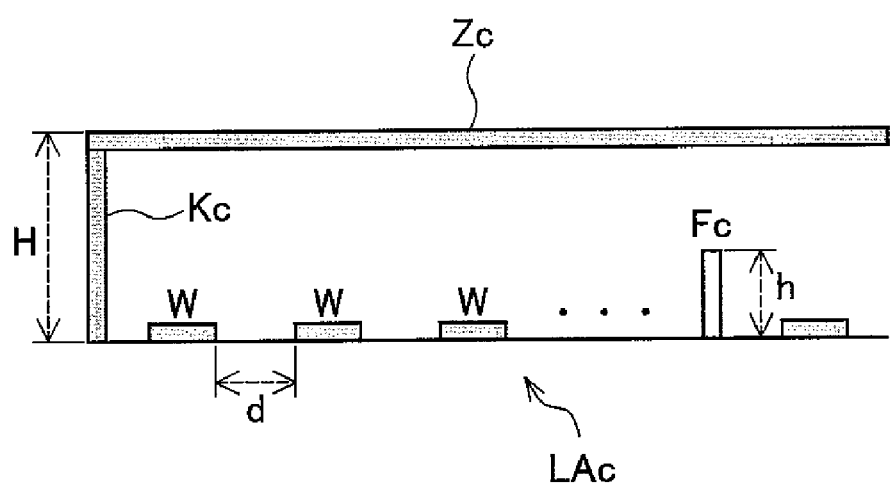
FIG. 20B is a cross-sectional view showing the configuration of the backlight device shown in FIG. 20A.

The backlight device of the present preferred embodiment, as illustrated in FIGS. 20A and 20B, includes a plurality of illumination areas LAc, each of which is preferably provided with nine white LEDs (abbreviated as W) of the same wavelength. These white LEDs are disposed in a matrix pattern in each of the illumination areas. Furthermore, each of the illumination areas LAc is partitioned by a second separation wall Fc and a first separation wall Kc is arranged so as to surround the entire illumination areas. Moreover, a light diffusion plate Zc is provided at an upper portion of each of the white LEDs. Here, a distance between each of the white LEDs and the light diffusion plate Zc is substantially equivalent to a height H of the first separation wall Kc.

In the present preferred embodiment, a size of each of the illumination areas LAc, the height H of the first separation wall Kc, and a height h of the second separation wall Fc are preferably set to approximately 60 mm×60 mm, 20 mm, and 10 mm, respectively, for example. Furthermore, in one illumination area, the nine white LEDs are preferably disposed at intervals of about 20 mm, for example. This white LED is configured by combining a blue LED with a fluorescent material, for example.

The aforementioned configuration also facilitates the color mixture in the vicinity of the second separation wall Fc even if each of the illumination areas is individually controlled. As a result, this makes it possible to effectively prevent the emission of the uneven luminance or uneven color in the vicinity of the second separation wall Fc. Furthermore, it is possible to prevent the vicinity of the second separation wall Fc from being darkened by the mixture of colors from each of the LEDs on the second separation wall Fc when each of the illumination areas is lit up in the same luminance. Therefore, the entire illumination areas can be uniformly illuminated.

The present invention is not limited to the description of the preferred embodiments above, but may be altered by a skilled person within the scope of the claims. A preferred embodiment based on a proper combination of technical features disclosed in different preferred embodiments is encompassed in the technical scope of the present invention.

The illumination device of the present invention is suitable for a backlight device of a liquid crystal display apparatus (a liquid crystal television receiver, for example).

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. An illumination device for a liquid crystal display comprising:
    illumination areas;
    drive circuits corresponding to respective ones of the illumination areas;
    a first separation wall surrounding said illumination areas; and
    a second separation wall partitioning each of said illumination areas and being lower than said first separation wall; wherein
    each of the illumination areas includes a first light-emitting device package, a second light-emitting device package, and a third light-emitting device package;
    each of the first, the second, and the third light-emitting device packages includes light-emitting devices;
    the first and the second light-emitting device packages are adjacent to each other in a row direction, an arrangement of emission colors in the first light-emitting device packages being different from an arrangement of emission colors in the second light-emitting device packages;
    the first and the third light-emitting device packages are adjacent to each other in a column direction, an arrangement of emission colors in the first light-emitting device packages being different from an arrangement of emission colors in the third light-emitting device packages; and
    the drive circuits are configured to drive the light-emitting devices in respective ones of the illumination areas, based on image data inputted to the liquid crystal display.

2. The illumination device as set forth in claim 1, wherein said second separation wall is about half or less as high as said first separation wall.

3. The illumination device as set forth in claim 1, wherein an interval between each of the first, the second, and the third light-emitting device packages is equivalent to or less than a height of said first separation wall.

4. The illumination device as set forth in claim 1, wherein each of the first, the second, and the third light-emitting devices includes an LED.

5. The illumination device as set forth in claim 4, wherein the first, the second, and the third light-emitting devices includes red, green, and blue LEDs.

6. The illumination device as set forth in claim 5, wherein one red LED, one green LED, and one blue LED are disposed in a delta pattern in each of the first, the second, and the third light-emitting device packages.

7. The illumination device as set forth in claim 5, wherein one red LED, two green LEDs, and one blue LED are disposed in a matrix pattern in each of the first, the second, and the third light-emitting device packages.

8. The illumination device as set forth in claim 1, further comprising a light diffusion plate arranged to face each of said light-emitting devices, wherein a distance between said light diffusion plate and each of said light-emitting devices being equivalent to said height of said first separation wall.

9. A backlight device for a liquid crystal display apparatus, comprising the illumination device as set forth in claim 1.

10. A liquid crystal display apparatus comprising the illumination device as set forth in claim 1.

* * * * *